April 23, 1929.  G. M. PELTON  1,710,031
LOG TURNER
Filed Jan. 2, 1925
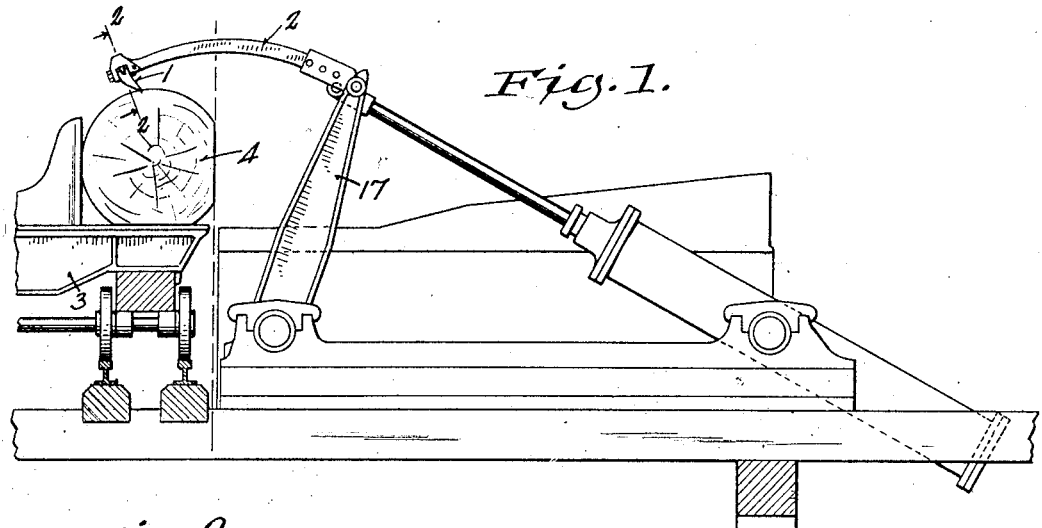
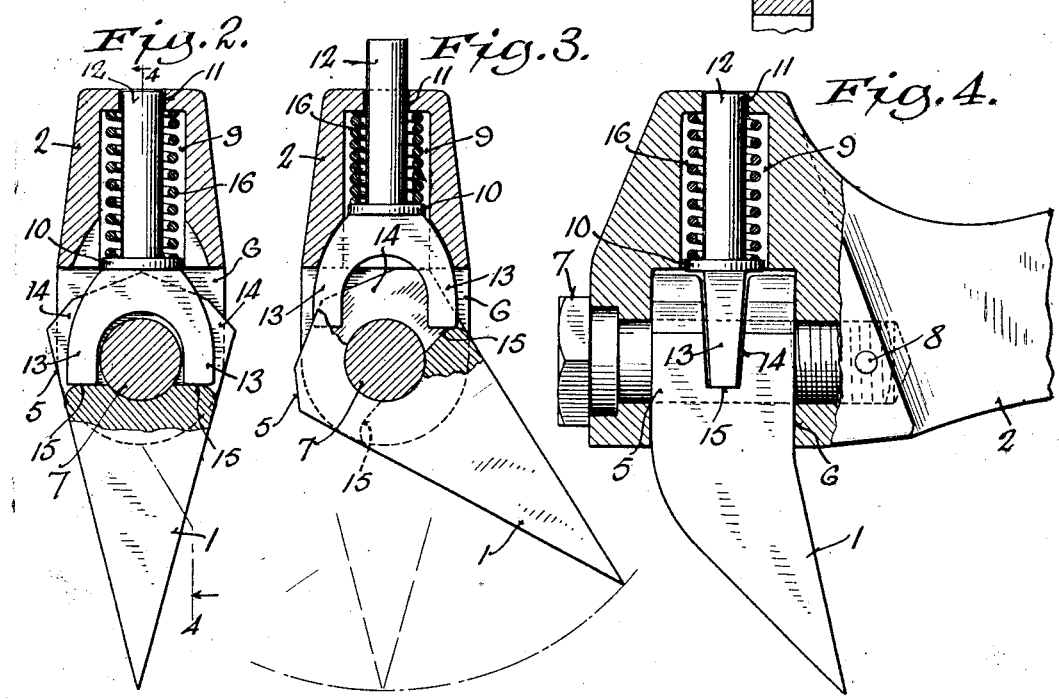
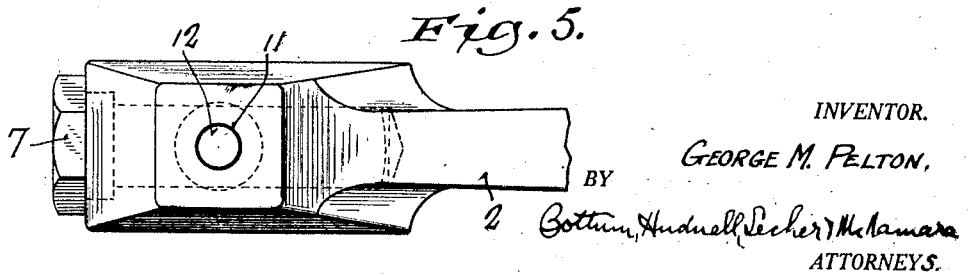
INVENTOR.
GEORGE M. PELTON,
BY
ATTORNEYS.

Patented Apr. 23, 1929.

1,710,031

UNITED STATES PATENT OFFICE.

GEORGE M. PELTON, OF MILWAUKEE, WISCONSIN ASSIGNOR TO THE FILER & STOWELL CO., OF MILWAUKEE, WISCONSIN, A CORPORATION OF WISCONSIN.

LOG TURNER.

Application filed January 2, 1925. Serial No. 56.

This invention relates to improvements in log turners and more particularly to the hook for gripping the log.

An object of the invention is to provide a hook for a log turner with a tooth adapted to give or tilt to prevent bending or possible breakage of the hook or hook arm if the log carriage is moved while the tooth is still embedded in the log.

Another object is to provide an improved hook for a log turner which is strong, durable, and which may be economically manufactured.

Other objects and advantages will hereinafter appear.

For the purpose of illustrating the invention, an embodiment thereof is shown in the drawings, in which Figure 1 is a side elevation showing the manner in which the log turner is operated to turn a log;

Fig. 2 is a section on line 2—2 of Fig. 1 through the hook;

Fig. 3 is a view similar to Fig. 2, showing the manner in which the tooth gives or tilts to prevent bending or possible breakage of the hook or hook arm when the log carriage is moved;

Fig. 4 is a section on line 4—4 of Fig. 2; and

Fig. 5 is a plan view.

In accordance with the invention, a tooth 1 is mounted at the end of the hook 2 for movement with respect thereto in a plane substantially parallel with the movement of the carriage 3 for moving a log 4.

The head 5 of tooth 1 fits loosely in a slot 6 formed in the underside of hook 2 at the end thereof, and is provided with an opening to receive a bolt 7 or other suitable means for pivotally connecting tooth 1 to the end of hook 2.

The bolt 7, as shown in Fig. 4, is threaded into the end of hook 2 to hold tooth 1 in operative position within slot 6 and is locked in position by any suitable means such as a pin 8 passing through hook 2 and the end of bolt 7.

It is desirable to provide some means for yieldingly holding tooth 1 in operative position with respect to hook 2 to engage the log. For this purpose the upper portion of the end of hook 2 may be provided with a chamber 9 to receive a member 10, the chamber 9 communicating at the bottom thereof with slot 6 and having the upper wall thereof provided with an opening 11.

The member 10 may comprise a stem 12 arranged in chamber 9 and loosely fitted in opening 11 for movement in chamber 9, and a pair of legs 13 spaced apart to straddle bolt 7 and fit into a recess 14 in the head 5 of tooth 1.

The bottom of recess 14 provides shoulders 15 which are engaged by the ends of legs 13 for the purpose hereinafter explained.

A spring 16 may be arranged on stem 12 of member 10 to act against the upper wall of chamber 9 and member 10 to urge the member downwardly and maintain engagement of one or both of legs 13 with shoulders 15.

If hook 2 is actuated in the usual manner to engage tooth 1 with the log, as shown in Fig. 1, and carriage 3 inadvertently moved forward, log 4 will carry the point of tooth 1 along with it so that the tooth will give or tilt about the bolt or pivot 7 and take the position shown in Fig. 3. One of the shoulders 15 will then force member 10 upwardly against the action of spring 16 through its engagement with the corresponding leg 13. The hook 2 and hook arm 17 pivotally connected thereto are thereby relieved of unnecessary strain and possible breakage. When hook 2 is again raised, or the log moved from under tooth 1, spring 16 will force member 10 downwardly to return tooth 1 to its normal operative position with respect to hook 2, as shown in Fig. 2.

Various changes of structure and arrangement of the parts may be adopted without departing from the spirit of the invention or the scope of the claims.

The invention claimed is:

1. In a log-turner, in combination, a substantially rigid hook adapted to extend across a log, and a tooth directly and pivotally mounted on said hook at the outer end thereof for transverse tilting movement about an axis extending in the general direction of the length of said hook.

2. In a log turner, in combination, a hook having a slot at the end thereof and a chamber communicating with said slot, a tooth provided with a head, said head being loosely fitted into said slot, means arranged to hold said head in operative position in said slot to permit tilting movement of said tooth with respect to said hook, a member having a stem arranged in said chamber and a pair of legs arranged to engage said head, and a spring arranged upon said stem to act upon said member to effect return movement of said tooth to normal operative position with respect to said hook when said tooth is tilted.

3. The combination with a sawmill carriage of a substantially rigid log-turning member, means for supporting the log-turning member adjacent the carriage and for constraining the log-turning member to movement transversely relative thereto, and a log-engaging tooth mounted on said member for tilting movement about an axis extending lengthwise of said member.

4. The combination with a sawmill carriage of a substantially rigid log-turning member, means for supporting the log-turning member adjacent the carriage and for constraining the log-turning member to movement transversely relative thereto, and a log-engaging tooth tiltably mounted on said member for tilting movement with respect to the member in a plane approximately parallel to the plane of the saw cut, and spring means for returning said tooth to and normally holding the latter in operative position with respect to said member.

5. A log turner for use in conjunction with a sawmill carriage and comprising a substantially rigid hook, and a tooth mounted on the hook for movement in the general direction of the longitudinal axis of the log and entirely in a plane which contains the mean longitudinal axis of the tooth and cuts the log.

6. A log turner for use in conjunction with a sawmill carriage and comprising a substantially rigid hook mounted for swinging movement in the usual manner and a tooth mounted on the hook for tilting movement about an axis approximately radial to the axis of swing of the hook.

In witness whereof I hereto affix my signature.

GEORGE M. PELTON.